United States Patent [19]
Desjardins

[11] Patent Number: 5,936,571
[45] Date of Patent: Aug. 10, 1999

[54] INTEGRATED GPS/INTERFERENCE LOCATION SYSTEM

[75] Inventor: Gerard A. Desjardins, Endicott, N.Y.

[73] Assignee: Lockheed Martin Corporation, Bethesda, Md.

[21] Appl. No.: 08/797,682

[22] Filed: Jan. 31, 1997

[51] Int. Cl.[6] .............................. H04B 7/185; G01S 5/02
[52] U.S. Cl. .......................................... 342/357; 701/213
[58] Field of Search ............................. 342/357; 701/213

[56] References Cited

U.S. PATENT DOCUMENTS

| | | |
|---|---|---|
| 4,433,335 | 2/1984 | Wind . |
| 4,888,593 | 12/1989 | Friedman et al. . |
| 5,008,679 | 4/1991 | Effland et al. . |
| 5,317,323 | 5/1994 | Kennedy et al. . |
| 5,327,144 | 7/1994 | Stilp et al. ............................. 342/387 |
| 5,422,813 | 6/1995 | Schuchman et al. . |
| 5,483,244 | 1/1996 | Grube et al. . |
| 5,570,096 | 10/1996 | Knight et al. ............................ 342/357 |
| 5,608,410 | 3/1997 | Stilp et al. .............................. 342/387 |
| 5,629,707 | 5/1997 | Heuvel et al. ........................... 342/357 |

Primary Examiner—Theodore M. Blum
Attorney, Agent, or Firm—Whitham, Curtis & Whitham

[57] ABSTRACT

A Global Navigation Satellite System having user sets for computing position, velocity and time at each user set includes an arrangement for sampling and filtering an interfering signal or other signal of interest at each user set, a communication link to another user set to carry time-stamped signals representing filtered samples of the signal of interest together with position and velocity information of the user set and an arrangement for computing the location of the source of the signal of interest preferably contained in each user set from the transmitted information and similar locally developed information.

28 Claims, 4 Drawing Sheets

INTEGRATED GPS/INTERFERENCE LOCATION SYSTEM

BACKGROUND OF THE INVENTION

1. Field of the Invention

The present invention generally relates to Global Navigation Satellite Systems (GNSS) such as GPS and GLONASS and, more particularly, to locating sources of noise and other signals potentially interfering therewith.

2. Description of the Prior Art

Aids to navigation have been considered essential to commerce, exploration, military endeavors and the like for many years. In recent years, satellite position locating systems such as Global Positioning System (GPS) and Global Satellite Navigation System (GLONASS) which provide world wide coverage have become available. Such systems require only satellite communication with self contained user sets which automatically calculate position in three dimensions using four or more satellites to a positional accuracy of only a few meters.

GPS has been used by the U.S. military for precision positioning and targeting for many years. Today its use is being extended to command/control, situation awareness, IFF (Identification Friend or Foe) and even individual position locators for personnel. In addition, as the uses of GPS have expanded, the cost of the user sets has fallen dramatically further increasing GPS availability. Today, the civilian sector has become the largest GPS market. In aircraft navigation, the precision available from GPS may even be exploited for instrument landings. Navigational uses are being extended to small commercial and pleasure boats and to automobiles in which a GPS receiver is interfaced with a computer to display vehicle position and direction on maps and interactively provide routing information.

The high orbits (altitude of approximately 20,000 km), the L-Band frequency, and the relatively low transmitting powers (hundreds of watts) used by GNSS satellites limit the strength of the radio signal which is received by user sets. Further, due to the need to simultaneously monitor transmissions from a plurality of satellites at large angular distances from each other, non-directional antennas are generally employed to receive GNSS transmissions. Accordingly, GNSS user sets provide very large signal processing gain for the satellite signal. However, the processing margins are low and interference can be a problem.

Due to the proliferation of uses and the increased reliance on GNSS, denial of GNSS service due to interference is becoming increasingly intolerable since it may unpredictably deny GNSS service to a user, particularly at a critical moment, as in an aircraft landing. Interference may take many forms and may be either intentional, as in jamming, or unintentional, such as improperly filtered FM radio and television broadcast signals. Industrial machinery may also cause interference if not properly shielded or properly operated. Intentional jamming is relatively easy and could be accomplished over substantial distances or areas by a relatively low power (e.g. 1–100 Watt) RF noise source. A jammer capable of transmitting a GNSS like signal would require only a fraction of such power to produce a similar result.

The combination of the low interference power levels needed to disrupt GNSS operation, the GNSS operating frequencies (~1.5 GHz) and the use of wide bandwidth noise-like signals can make location of the interference sources very difficult. However, location of the interference source must be accomplished to avoid effects of the interference or to provide the information needed to find and eliminate the interference source and restore GNSS service.

Due to the world wide nature of GNSS and the fact that potential interference sources could be found almost anywhere, an interference location solution that is part of the GNSS user set is desirable. Such a location solution would then be available where ever GNSS is being used and would not be constrained to particular platforms or installations. Further, a solution that can share existing parts of the user set can be added at minimal cost making it available to more users.

SUMMARY OF THE INVENTION

It is therefore an object of the present invention to provide a system for locating sources of emissions which interfere with GNSS systems.

It is another object of the invention to provide for location of interference with the GNSS system using as much hardware of the GNSS user set as possible and at minimal cost.

It is a further object of the invention to provide convenience of correction, avoidance or elimination of signals interfering with the GNSS system at minimal cost.

It is yet another object of the invention to provide a location system for sources of GNSS interference wherever GNSS is used.

It is another further object of the invention to maximize integration of the GNSS user set with the system in accordance with the invention for the location of sources of interference therewith.

In order to accomplish these and other objects of the invention, a user set for a global positioning system is provided including an arrangement for storing position, velocity and time values, sampling a signal of interest, and transmitting samples of said signal of interest and said position, velocity, and time values to another user set.

In accordance with another aspect of the invention, a global positioning system having at least two user sets is provided including an arrangement for transmitting signals representing a signal of interest and user set position, velocity, and time from one user set to another user set, measuring time difference of arrival(TDOA) and frequency difference of arrival (FDOA) at said another user set, and determining a location of a source of said signal of interest using the measured TDOA and FDOA at said another user set.

The invention provides a communication link between user sets such that a signal of interest and information at a first user set are provided to another user set which can then compute the location of a source of a signal of interest, such as an interfering signal, from locally developed information concerning reception of the same signal at a second user set and the information transmitted from the first user set and any additional user sets from which similar information concerning the signal of interest is available.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
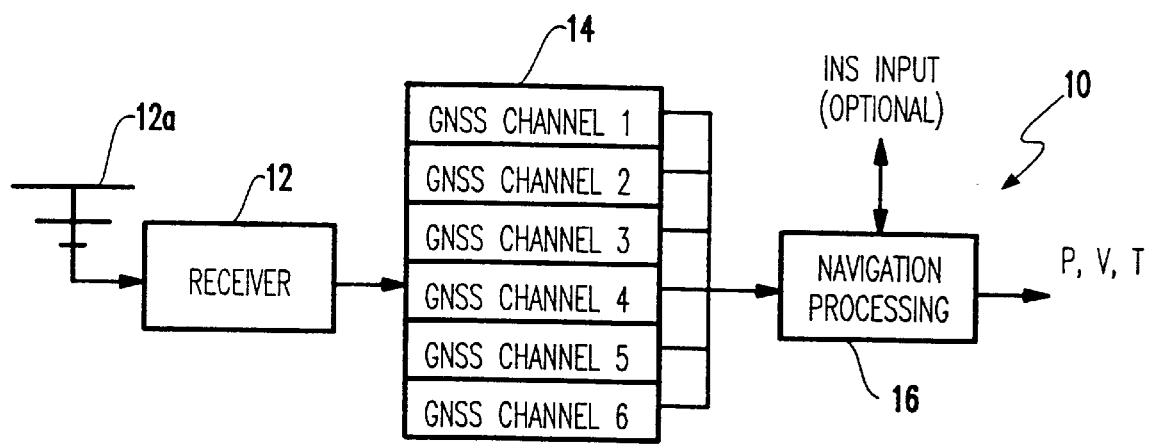
FIG. 1 is a block diagram of a GNSS user set as currently implemented.

Referring now to the drawings, and more particularly to FIG. 1, there is shown, in block diagram form, the organization of a typical GNSS user set 10, details of which are unimportant to the practice of the invention. GPS and GLONASS technology is well-developed and well-understood. A detailed description of GPS can be found in the U.S. Government documents, Technical Characteristics Of The Navstar GPS, June 1991 and GPS Interface Control Document ICD-GPS-200, July 1992. A detailed GLONASS description can be found in Global Satellite Navigation System GLONASS Interface Control Document (Second Wording) published by the Institute of Space Device Engineering, Glavkomos, Russia. The above documents are hereby incorporated by reference. A comprehensive source of information on GNSS systems is "Navigation", the Journal of the Institute of Navigation, 1800 Diagonal Road, Suite 480, Alexandria, Va. 22314.

The user set basically comprises a radio frequency antenna 12a and receiver 12 of appropriate design for the frequency and signal modulation employed to convert the received signals to a suitable IF frequency. A plurality of GNSS signal processing channels 14 are preferably provided to process the IF signals from the receiver 12. User sets including as few as one channel and as many as twelve channels for tracking satellites are commercially available. Tracking of four satellites is necessary to provide an unambiguous location in three dimensions. Additional channels may be used to search for additional satellite transmissions and provide additional redundant data to improve performance. Each channel extracts the satellite transmission signal relative time of arrival and measures the signal carrier phase. The satellite navigation message is also decoded. This information is then used by a navigation processing arrangement 16 to provide position (P), velocity (V) and time (T) (hereinafter P, V, T or PVT). The details of the receiver 12, GNSS signal channels 14 and the navigation processing 16 are not important to the practice of the invention although the design of antenna 12a may be advantageously adapted for directional interference reduction.

The plural channels may be physically different channels or may comprise the same hardware to process signals from different satellites or a combination of the two. The hardware allocation to the plural channels is an incident of the GNSS user set and is unimportant to the practice of the invention. In addition, for the purposes of this invention, the definition of a user set may be expanded to include spatial, time, frequency, and amplitude domain interference suppression hardware and processing. In fact, such interference suppression capability will improve the performance of the invention by providing for interference source location at higher signal-to-noise ratios.

It is important to an understanding and appreciation of the invention, however, to note that the information in the plural channels are subjected to correlation processing (generally implemented using a matched filter since the GNSS signal is known) to make precision time and frequency measurements using the same antenna and using a common time base and coordinate system across all sets of data provided by the satellite signals and across all user sets. Such processing requires a stable local oscillator and low phase noise and must include calibration for frequency drift and time delay. GNSS systems thus use information derived from the arrival time and frequency of signals from a plurality of synchronized emitters at known locations to determine position, velocity and time (P, V, T).

Figure 2:
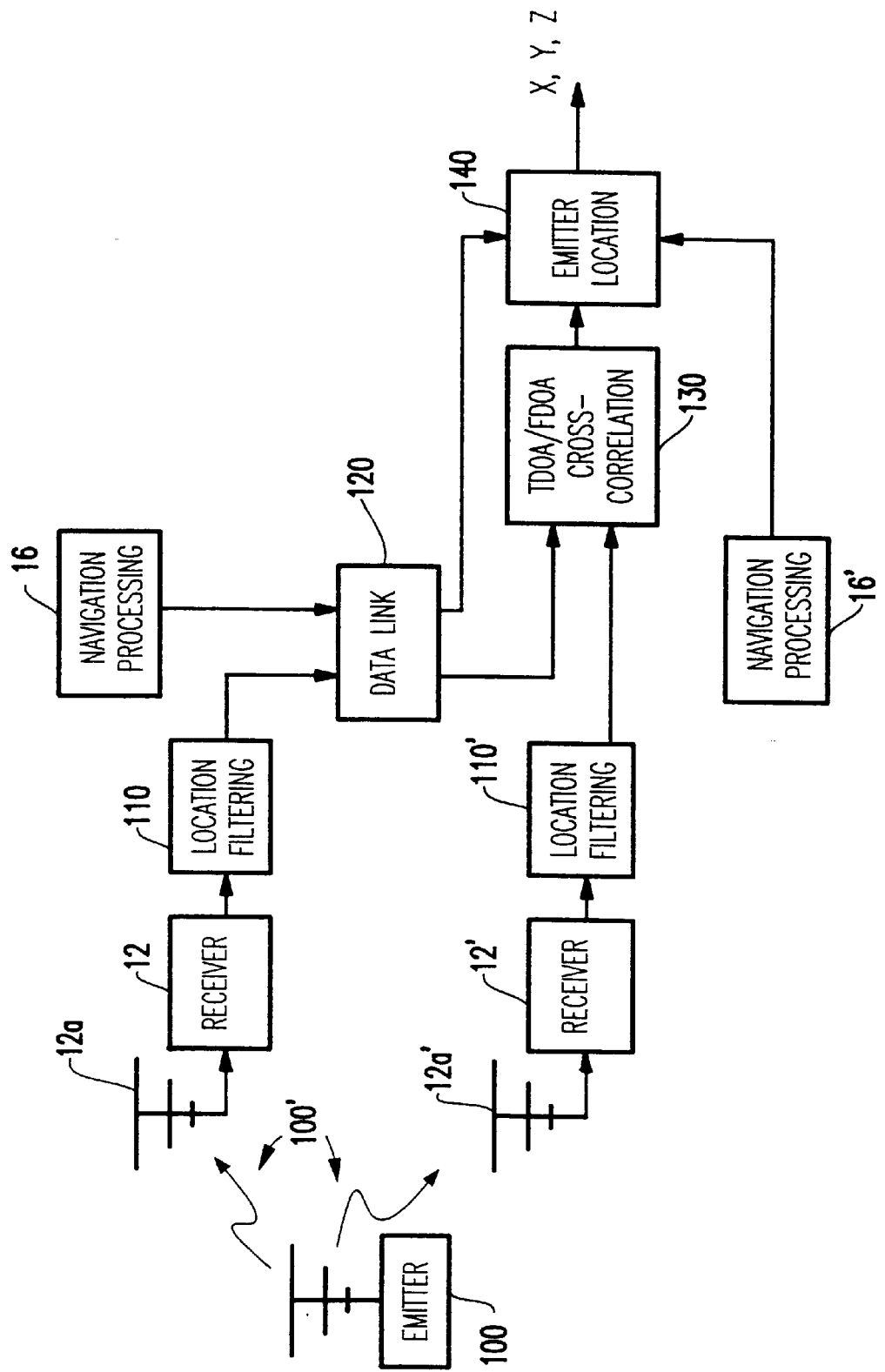
FIG. 2 is a block diagram of a TDOA (Time Difference Of Arrival)/FDOA (Frequency Difference Of Arrival) emitter location system.

Another correlation-based technique used for location of signal sources has become known in the art as "time difference of arrival" (TDOA) and frequency difference of arrival (FDOA) emitter location. A block diagram of a two platform TDOA/FDOA emitter location system is shown in FIG. 2. The signal 100' from emitter 100 is intercepted by antennas 12a and 12a' on two collection platforms. The intercepted signals are filtered, downconverted, and sampled in receivers, 12 and 12', and then digitally filtered at 110 and 110' in preparation for correlation processing. In addition, platform position, velocity, and time information during the collection interval is computed in Navigation Processing 16 and 16'. The navigation data and filtered signal data from one platform are sent to the other platform via a data link 120. At the second platform, the downconverted, sampled, and filtered signal data from the second platform is cross-correlated with that from the first platform and the emitter TDOA and FDOA are measured at 130.

The measured TDOA and FDOA are combined with the navigation data from the two platforms to locate the emitter 140. Two platforms are sufficient to locate an emitter in two dimensions (x,y) if at least one of them is moving. A minimum of three platforms must be used if all are stationary. It should be understood in this regard that "user set" may include a substantially fixed location facility. Measurements from additional platforms provide redundancy, improve accuracy, and can be used to estimate emitter z. TDOA/FDOA cross-correlation techniques inherently can deal with a wide variety of signals, from continuous wave (CW) to wide bandwidth modulation or noise. Further, the relatively long duration which is generally characteristic of significantly interfering signals, whether intentional or not, provide for the large bandwidth time product needed to accurately locate weak interference sources. (Conversely, a brief, potentially interfering signal is unlikely to significantly disrupt GNSS service.)

Like GNSS navigation, TDOA/FDOA location makes precision time and frequency measurements, requires low phase noise and stable local oscillators and frequency drift and time delay calibration. Further, TDOA/FDOA uses a common time base and coordinate system across all participating platforms. Finally, TDOA/FDOA uses platform PVT data to transform the TDOA/FDOA measurements into emitter location coordinates.

This invention exploits the similarities and interrelationships between GNSS and TDOA/FDOA to arrive at a highly integrated GNSS/Location solution. The additional hardware required to complete the location process, the data link, is already present on many platforms or can readily be added where needed as will be discussed with reference to FIG. 4.

Figure 3:
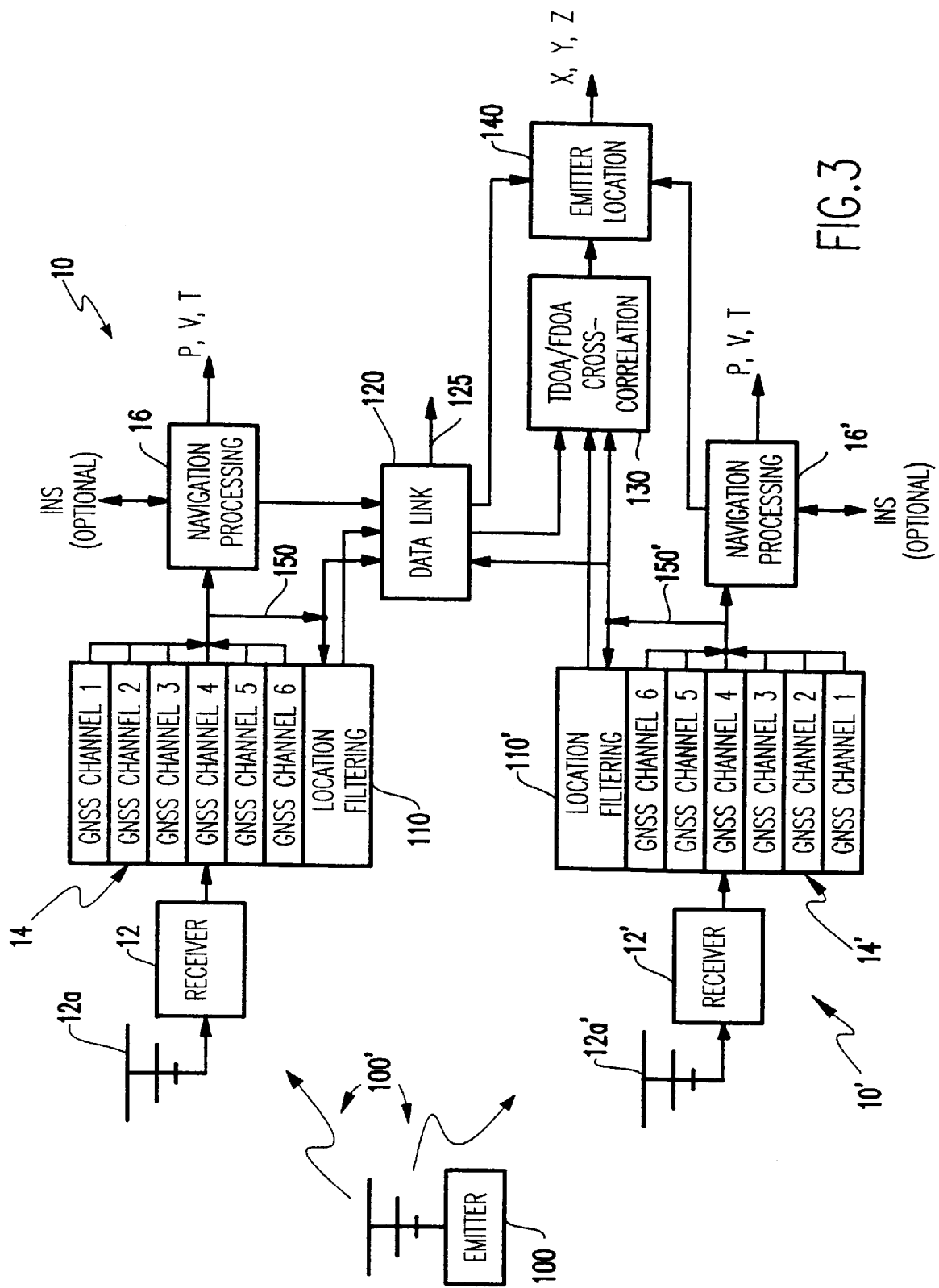
FIG. 3 is a block diagram of the emitter locating system of the present invention.

More specifically, FIG. 3 shows a high-level block diagram of a system for locating an RF emitter using two GNSS platforms. It should be understood that while the invention may be advantageously employed for determining the location of an emitter of an RF signal that interferes with the GNSS system and is most fully integrated therewith for such a purpose, the invention may be employed to determine the location of any RF emission source within the passband of the GNSS receiver which may be of interest.

FIG. 3 illustrates two GNSS user sets 10 and 10', each including a receiver 12, 12', a plurality of GNSS processing channels 14, 14' and navigation processing arrangements 16, 16', as described above. It is assumed that both of the GNSS user sets, 10 and 10', have access to a data link 120, interconnecting the two platforms. It is also assumed that both GNSS user sets can receive the signal (e.g. interference) from emitter 100. In practice, it is contemplated that GNSS user set 10, upon receiving an emitted signal 100' from emitter 100 will broadcast a signal descriptive of the emitted signal 100' and any other GNSS user set (e.g. 10') receiving both the emitted signal 100' and the broadcast signal (from any other user set receiving the interfering signal) and including the further processing circuitry in accordance with the invention would be enabled to carry out emitter position determination.

Alternatively, of course, the entire architecture of FIG. 3 could be provided in the same user set but with antennas 12a and 12a' spatially separated or in two user sets spatially separated but local to the same user. However, it should be understood that location accuracy increases with the separation of antennas and separate user sets widely separated, as would be the case with different users, is preferred. Further, it is preferred to implement the invention as a system with each user set of the system having substantially the same hardware capability as illustrated for user set 10' so that any user set can locally determine the location of emitter 100 and any two or more user sets constitute a complete emitter location capability.

In addition to the basic elements of a GPS user set, an integrated GPS/TDOA/FDOA/emitter location set (hereinafter GLS) in accordance with the invention, also includes a filtering arrangement 110, 110' in order to digitally filter and decimate the signal 100', if necessary. Each sample preferably is time referenced by a time stamp applied to at least one sample (from which the time of each other sample could be derived, if not provided individually or by groups). A frequency stamp for the collected data is provided as well. The data link 120 also is provided with the position and velocity signals as said platform navigation data is necessary to convert measured TDOA and FDOA to emitter location.

Continuing the assumption that GLS user set 10' is also receiving signal 100', the signal is similarly filtered and decimated at digital filter 110' as at digital filter 110. These samples and those transmitted over the data link 120 are then cross-correlated at 130. Numerous digital or analog cross-correlation techniques are known and familiar to those skilled in the art and, in any event, the particular cross-correlation technique employed is not critical or particularly important to the practice of the invention. "Algorithms for Ambiguity Function Processing" by Seymour Stein, IEEE Trans. ASSP, June 1981, describes the preferred TDOA/FDOA measurement processes and is fully incorporated by reference. It is preferred that a TDOA/FDOA cross-correlation technique having substantial similarity and, hence, hardware and processing requirements, to the correlation processing employed in the GNSS user set 10, 10' be employed.

As a result of the cross-correlation process, a peak is created in the correlation surface at the time and frequency differences corresponding to the emitter. The peak parameters (TDOA and FDOA) are measured. This information and the position and velocity of each GNSS user set are then provided to the emitter location processor 140, preferably embodied by the processor used for GNSS navigation, to determine emitter location.

It should be noted that if either user set 10, 10' is in motion, the TDOA/FDOA will resolve to a specific location for the emitter 100. If both are stationary, a locus of possible locations will be determined from the two user sets illustrated in FIG. 3 and a third user set corresponding to user set 10 will be required to resolve a specific location on that locus. However, even though a third user set may not be necessary to the practice of the invention, in view of the improved robustness of the system and the unconditional capability of resolving a specific location resulting from providing for communication with a third user set, if available, use of a third set of signal samples is preferred.

Operationally, the GLS system would be operated and function as a GNSS user set to continuously compute P, V, and T. When an interfering signal or other signal of interest is detected by a suitable detector, as schematically depicted by arrows 150, 150' (and which could be simply a loss of the expected signal in any or all of the GNSS channels 14 or a reduction in observed signal to noise ratio in the channels), the GLS user set is activated to also enter into emitter locating mode. In user set 10, this activates filtering arrangement 110 and data link 120. In user set 10', filtering arrangement 110', data link 120, and TDOA/FDOA cross-correlation processing 130, are initiated.

If, due to the interference, valid P, V, and T can no longer be computed by the GLS user set, the last valid values of P, V and T are stored. Estimation of P and V can be continued using, for example, an Inertial Navigation System (INS), if available. However, the location accuracy achievable using INS data alone will gradually degrade with time. Thus, location of the interference source as soon as possible after it has been detected is preferred.

A stable time base, not shown in the interest of clarity but included in the GNSS portion of each user set of the GLS system, continues to function to control sampling of the signal of interest and to supply time stamp information for transmission over data link 120 and/or internal location computation by TDOA/FDOA cross-correlation by element 130 and resolution of emitter position by combination of results with platform P and v data (and crosscorrelation results and platform navigation data from one or more additional pairs of user sets) at element 140, as discussed above.

When location of emitter 100 is determined, local corrective action can be taken such as disabling operation of the signal, avoiding the signal or the like. Alternatively, the result may be transmitted as indicated at 125 to a receiver at a remote location for corrective action to be taken. When the interference is no longer present, the GLS system reverts to the GNSS-only functional mode.

Figure 4:
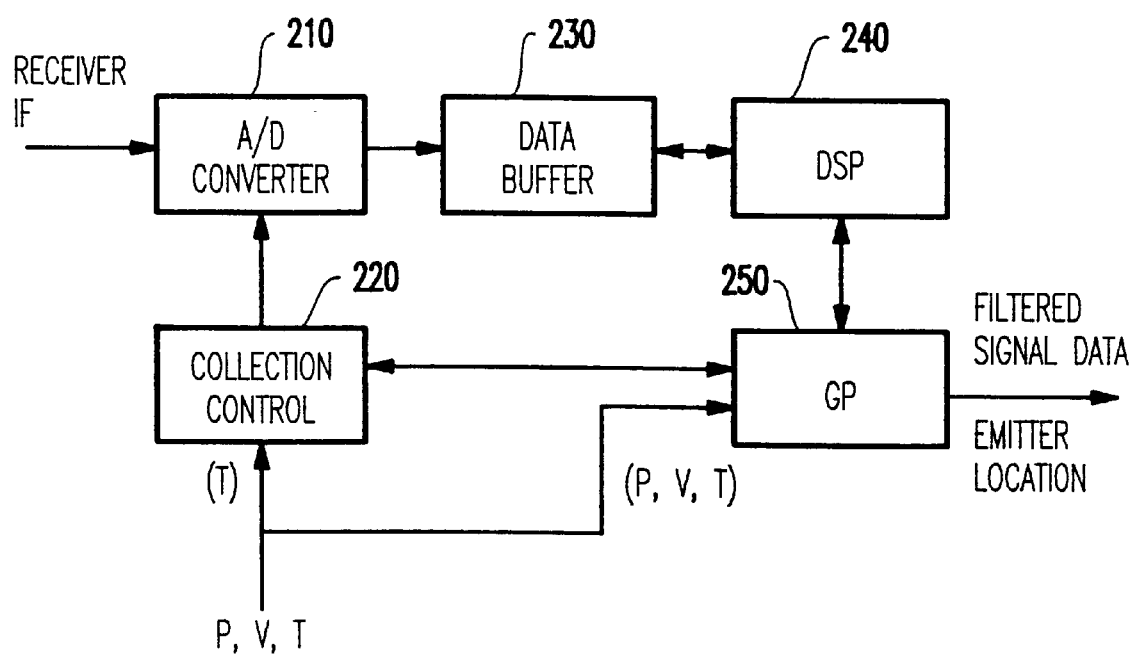
FIG. 4 is a schematic diagram illustrating the development of an emission source locating capability in a GNSS user set.

In view of the foregoing, it is apparent that a system for locating the source of a signal interfering with a GNSS user set has been provided which can be highly integrated with the GNSS user set with very little, if any, additional hardware and only minimal additional processing capability. In a worst case of retrofitting a user set to develop the meritorious effects of the invention, only an A/D converter, a data buffer, a digital signal processor (DSP), a general purpose processor, and a signal data collection controller (implemented using a field programmable gate array (FPGA) or equivalent) need be suitably interconnected with a user set as shown in FIG. 4. The A/D converter 210, samples the downconverted signal data provided by the user set receiver 12, under control of the Collection Controller 220.

The Collection Controller 220 starts the flow of sampled signal data into the data buffer 230, determines the time of the first sample, and stops the flow of signal data into the buffer after a sufficient number of signal samples have been collected. Data buffer 230 stores the sampled signal data to be processed for emitter location. The DSP 240 performs Location Filtering and TDOA/FDOA Cross-Correlation processing. The GP (general purpose) processor 250 serves as the interface to the data link, controls the Collection Controller and the DSP and also performs Emitter Location processing. However, in cases of GNSS user sets in which processing is performed in general purpose DSPs, addition of software may be sufficient to the practice of the invention.

The GLS in accordance with the invention is thus seen to share virtually all components of the GNSS user set and to utilize many of them on a shared basis for signal emitter location determination when an interfering signal is detected. Further, it is evident that a substantial and important further capability may be provided in GNSS user sets at minimal cost and little or no impediment to the GNSS function while developing significant and valuable additional capabilities. Moreover, the GLS system in accordance with the invention is inherently as mobile as the GNSS user sets with which it is employed and inherently places GLS resources at the point at which they are of most use and from which remedial action may often be most advantageously taken. While greatest generality and robustness of the GLS system will be provided when all user sets have similar capability and function, it is also to be understood that the depiction of FIG. 3 could be considered as a Master-Slave organization for even greater hardware and processing efficiency.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A user set for a global positioning system including:
a receiver for receiving a navigation signal and a signal of interest within a same GNSS frequency band,
means for determining position, velocity and time values of said user set based on the navigation signal received by said receiver, and
means for sampling the signal of interest received by said receiver.

2. A user set as recited in claim 1, further comprising:
means for transmitting samples of said signal of interest and said position, velocity, and time values of said user set to another user set for determination of a location of an emitter of said signal of interest.

3. A user set as recited in claim 1, further including means for receiving samples of said signal of interest and said position, velocity, and time values from another user set.

4. A user set as recited in claim 3, further including means for calculating a locus of possible locations of an emitter of said signal of interest from an output of said means for determining position, velocity, and time values, said means for sampling a signal of interest, and said means for receiving samples of said signal of interest and said position, velocity, and time values from another user set.

5. A user set as recited in claim 3, further including means for calculating a location of an emitter of said signal of interest from an output of said means for determining position, velocity, and time values, said means for sampling a signal of interest, and said means for receiving samples of said signal of interest and said position velocity, and time values from at least said another user set.

6. A user set as recited in claim 5, wherein said means for receiving samples of said signal of interest and said position, velocity, and time values are from said another user set and at least one other user set.

7. A user set as recited in claim 4, further including means for transmitting said locus of possible locations to a receiver.

8. A user set as recited in claim 5, further including means for transmitting said location to a receiver.

9. A user set as recited in claim 4, further including means for taking local corrective action based on the location of the emitter as determined by said calculating means, said local corrective action including eliminating an effect of said signal of interest on a manner in which said user set determines global positions.

10. A user set as recited in claim 5, further including means for taking local corrective action based on the location of the emitter as determined by said calculating means, said local corrective action including eliminating an effect of said signal of interest on a manner in which said user set determines global positions.

11. A system having at least two GNSS user sets, said system including:
means for collecting, through a single receiver, signals representing a signal of interest and signals from which user set position, velocity, and time values are derived, and means for transmitting said signals from one user set to another user set,
means for collecting, through another receiver, signals representing said signal of interest and signals from which user set position, velocity, and time values are derived at said another user set,
means for measuring time difference of arrival (TDOA) and frequency difference of arrival (FDOA) at said another user set, and
means for determining a location of a source of said signal of interest using the measured TDOA and FDOA and user set position and velocity values at said another user set.

12. A system as recited in claim 11, wherein said means for determining a location of a source of said signal of interest is included in a user set.

13. A system as recited in claim 11, further including means for transmitting said location to a receiver.

14. A system as recited in claim 12, further including means for transmitting said location to a receiver.

15. A system as recited in claim 12, further including means for taking corrective action in regard to said signal of interest at said user set.

16. A system as recited in claim 15, further including means for transmitting said location to a receiver.

17. A method for determining a location of an emitter source within a global positioning system, said method comprising steps of:
receiving a navigation signal and a signal of interest through a receiver in a first user set, said navigation signal and signal of interest lying within a GNSS frequency band;
determining position, velocity, and time values for the first user set based on the navigation signal received by said receiver;
sampling the signal of interest received by said receiver to generate a first set of samples; and transmitting samples of said signal of interest and said position, velocity, and time values to a second user set.

18. The method of claim 17, further comprising:

receiving a navigation signal and the signal of interest through a receiver in the second user set, determining position, velocity, and time values for the second user set based on the navigation signal received by the receiver in said second user set;

sampling the signal of interest as received by the receiver in said second user set to generate a second set of samples; and determining, in said second user set, the location of said emitter based on the position, velocity, and time values determined for said first user set, the position and velocity values determined by said second user set, the first set of samples, and the second set of samples.

19. The method of claim 18, further comprising:

transmitting the second set of samples and the position, velocity, and time values determined for said second user set to said first user set for determination of the location of said emitter by a processing unit in said first user set.

20. The method of claim 18, further comprising:

transmitting the first set of samples and the position, velocity, and time values determined for said first user set from said first user set to a processing unit;

transmitting the second set of samples and the position, velocity, and time values determined for said second user set from said second user set to a processing unit, said processing unit determining the location of said emitter based on the position, velocity, and time values determined for said first user set, the position and velocity determined by said second user set, the first set of samples, and the second set of samples.

21. The method of claim 18, further comprising:

cross-correlating the first set of samples and the second set of samples; and determining time difference of arrival (TDOA) and frequency difference of arrival (FDOA) values based on a result of the cross-correlating step.

22. The method of claim 21, wherein said cross-correlating step and said TDOA and FDOA determining step are performed in said first user set.

23. The method of claim 21, further comprising:

determining a locus of possible locations of said emitter if the first user set and second user set are stationary, determining position and velocity values for at least a third user set receiving the signal of interest;

sampling the signal of interest as received by said third user set to generate a third set of samples; and determining which of the possible locations of said locus is the location of said emitter based on the position and velocity values for said third user set and the third set of samples.

24. The method of claim 18, wherein said first user set and said second user set are same, said first user set having an antenna spaced a predetermined distance from said second user set.

25. The method of claim 18, wherein said signal of interest is an interference signal.

26. The method of claim 21, further comprising:

eliminating an effect of the interference signal from the first user set.

27. The method of claim 26, further comprising:

wherein said eliminating step includes at least one of disabling operation of said signal of interest and avoiding said signal of interest.

28. A system for determining a location of an emitter source in a global positioning system, comprising:

a first user set including a unit which determines position, velocity, and time values for said first user set and which samples a signal of interest as received by said first user set to generate a first set of samples;

a second user set including a unit which determines position, velocity, and time values for a second user set, and which samples a signal of interest as received by said second user set to generate a second set of samples; and a unit which transmits the second set of samples and the position, velocity, and time values of said second user set to said first user set, wherein the first user set further includes:

a unit which determines a location of an emitter of the signal of interest based on the position, velocity, and time values of said first user set, the position, velocity, and time values of said second user set, the first set of samples, and the second set of samples.

* * * * *